US011678612B2

United States Patent
Khemira et al.

(10) Patent No.: US 11,678,612 B2
(45) Date of Patent: Jun. 20, 2023

(54) PLASMA TREATMENT METHOD AND SYSTEM FOR PLANTS

(71) Applicants: Habib Khemira, Jazan (SA); Zaka-Ul-Islam Mujahid, Jazan (SA)

(72) Inventors: Habib Khemira, Jazan (SA); Zaka-Ul-Islam Mujahid, Jazan (SA)

(73) Assignee: Jazan University, Jazan (SA)

( * ) Notice: Subject to any disclaimer, the term of this patent is extended or adjusted under 35 U.S.C. 154(b) by 25 days.

(21) Appl. No.: 15/907,956

(22) Filed: Feb. 28, 2018

(65) Prior Publication Data

US 2022/0159909 A1 May 26, 2022

(51) Int. Cl.
A01G 7/04 (2006.01)
A01G 22/60 (2018.01)

(52) U.S. Cl.
CPC .............. *A01G 7/04* (2013.01); *A01G 22/60* (2018.02)

(58) Field of Classification Search
CPC .............. A01G 7/00; A01G 7/04; A01G 7/06
See application file for complete search history.

(56) References Cited

U.S. PATENT DOCUMENTS

| 5,281,315 | A | 1/1994 | Krapivina et al. |
| 6,096,564 | A * | 8/2000 | Denes .................... H01L 21/00 438/1 |
| 8,103,340 | B2 | 1/2012 | Viol |
| 2015/0088234 | A1 * | 3/2015 | Weltmann ............... A61N 1/44 |
| 2015/0105716 | A1 * | 4/2015 | Ish-Yamini ............. B01J 19/08 |
| 2015/0373923 | A1 * | 12/2015 | Ferrell .................... A01G 7/06 |
| 2017/0099782 | A1 * | 4/2017 | Wolfe ...................... A01G 7/04 |

FOREIGN PATENT DOCUMENTS

| RU | 2317668 | 2/2008 |
| WO | 1998/011770 | 3/1998 |

* cited by examiner

Primary Examiner — Joshua E Rodden
Assistant Examiner — Henry Hooper Mudd
(74) Attorney, Agent, or Firm — Edward R. Ergenzinger

(57) ABSTRACT

A system and method for treating a plant structure (bulbs, corms, tubers, rhizomes, buds, cuttings and whole plants) with low-temperature plasma to increase one or more growth and development characteristic of the plant and reduce microbial attacks. The plasma device is a portable or mobile plasma device powered by a DC or high-frequency power source. The plant structure is inserted into an enclosure containing the plasma. Alternatively, the plasma device is moved to treat the whole plant structure.

7 Claims, 9 Drawing Sheets

PLASMA TREATMENT METHOD AND SYSTEM FOR PLANTS

CROSS-REFERENCE TO RELATED APPLICATIONS

The present Utility patent application claims priority benefit of the U.S. provisional application for patent Ser. No. 62/465,449 entitled "A PLASMA TREATMENT METHOD FOR PLANTS", filed on 1 Mar. 2017 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to treatment of biological material from a plant source using plasma. More particularly, certain embodiments of the invention relates to a system and method of using a low-temperature plasma system for the treatment of dormant plant meristems including flower buds and vegetative buds and cambium tissue, on whole plants or parts of plants (e.g. cuttings, bulbs, and tubers) both in-situ and ex-situ.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, most grape vines, deciduous fruit and nut trees, ornamental woody species and flower bulbs may cease active growth in early fall, lose their leaves and become dormant in winter before resuming growth the following spring.

Under natural conditions, dormancy may be released by cold weather (e.g. chilling). In most cases, once the plant's chilling requirements, if any, are satisfied, the dormant structures (e.g. buds, meristems or seeds) may resume active growth if environmental conditions are adequate. If the chilling requirement of a plant is not met such as in mild-winter regions, budbreak may become erratic and asynchronous leading to reduced vegetative growth, spread out flowering and fruit maturation and often reduced yield.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that, in general, plant growers may resort to the application of artificial rest-breaking agents such as, but not limited to, thiourea, calcium cyanamide, potassium nitrate and hydrogen cyanamide. The latter chemical may be the most useful for several fruit crops such as grapevine and kiwi vines. It is believed that the effectiveness of the treatment depends on the time of application. In most cases, certain chemicals may be restricted in several countries because of its high toxicity to humans and wildlife. Most of these chemicals may be phytotoxic to the plant itself and neighboring crops.

For high-value ornamental crops such as flower bulbs, artificial cold in climate-controlled rooms may be used to release dormancy and induce flowering. This method, known as "pushing" may be complicated since both the duration and intensity of the cold stimulus and the subsequent warm period and duration of illumination must be controlled precisely. Also, this method may be expensive due to high energy costs and naturally cannot be applied to field-grown plants such as grapevines and fruit trees.

Presently, there may be no viably safe, environmentally friendly, organic-production compatible, and affordable method to release plant dormancy and invigorate shoots and blossoms that can be used both indoor and in the field.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is an exemplary illustration of untreated grape buds of the variety Muscat of Alexandria. FIG. 2B is an exemplary illustration of treated grape buds of the variety Muscat of Alexandria;

FIG. 5A is an exemplary illustration of untreated grape buds of a variety Muscat of Alexandria, in accordance with an embodiment of the present invention. FIG. 5B is an exemplary illustration of plasma-treated grape buds 555 of a variety Muscat of Alexandria, in accordance with an embodiment of the present invention;

Figure 1:
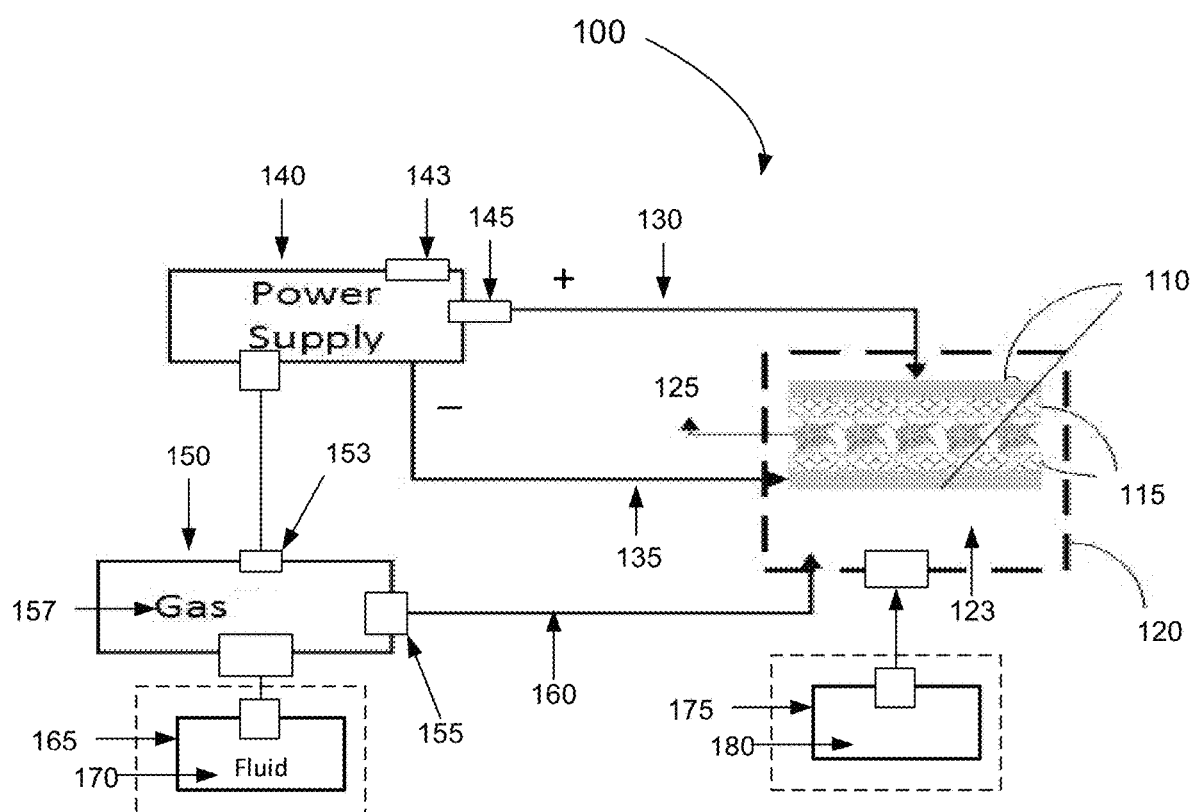
FIG. 1 is an illustration of an exemplary low-temperature plasma system, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components is described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

In an embodiment of the present invention, the object of the present invention is to develop a means to release plant dormancy and promote vegetative growth, flowering and fruiting without the dangers of toxicity to farm workers, wildlife, and plants. And, a method of releasing bud dormancy and inducing or improving bud break and suppress populations of bacteria, fungi or insects on plants by the application of low-temperature plasma.

In some embodiments, a low temperature or non-equilibrium plasma has a gas temperature substantially lower than the electron temperature. The low temperature plasma may be generated where a large combinations of gas pressure, geometry, power supply, gas chemistry may be used. The plasma may be alone or a combination of a surface plasma or volume plasma or corona or glow discharge, arc, streamers, micro discharges, operating any of the known modes. The plasma or plasma generated part is a neutral, quasi-neutral or charged positively or negatively. The plasma can generate electrons, ions, radiation, radicals, neutrals, reactive species, heat, ozone individually or a combination which may generate the desired effect. For example, the low temperature plasma may modify the vigor of vegetative growth and flowers; may alter the time of vegetative growth of flowering and fruiting of plants (as a whole or their organs such as buds, bulbs, seeds, corms, tubers, rhizomes or cuttings), somatic embryos or tissue culture plantlets; suppresses populations of bacteria, fungi or insects on plants as a whole or their organs such as, but not limited to, buds, bulbs, seeds, corms, tubers, rhizomes or cuttings), somatic embryos or tissue culture plantlets. The plants may be immersed or exposed completely or partially to the plasma itself or plasma plume or plasma effluent or plasma jet or plasma generated radicals, plasma generated species, plasma generated ions, plasma generated heat, plasma generated radiation individually or in combinations. The exact and optimum operating parameters may depend largely on the kind, part and combinations of plasma system and the plant or the plant parts. Plasma may comprise of powered and grounded electrodes. An exemplary arrangement is shown in FIG. 1. However, numerous conventional plasma generating devices and designs may be used. The plasma source may be mounted on a moving vehicle such as a tractor. In other embodiments of the present invention, the plasma source may be stationary and the plant material to be treated is brought to the treatment area either by hand, an automatic feeding apparatus or a conveyor belt. A method of treatment according to any of the preceding claims which operate at a gas pressure of 10 to 2000 Pa in air or flowing gasses. The operation below or above the atmospheric pressure may generated in an enclosure whereas the atmospheric pressure operation may be generated in open air. The gas may be transferred using a flow controller or a fan or a gasses from a compressed gas source controlled through a pressure and flow controller. The lower pressure may generated by a vacuum pump. (e.g. operate at a gas pressure of 10 to 2000 Pa in air or flowing gasses). Treatment process(es) according to any one of the preceding claims in which the plasma region is cooled by force-feed air or other gasses. The region where plasma may be generated is fed air or other gases by fan, gasses from a compressed gas source controlled through a pressure and flow controller. (e.g. plasma region is cooled by force-feed air or other gasses). Treatment process(es) according to any one of the preceding claims in which the plasma region is force fed with water vapors and other gasses to increase the reactivity. The water or liquid may be sprayed as mist in the plasma region through a liquid sprayer or bubbling the gas through the liquid. (e.g. plasma region is force fed with water or other liquid vapors and other gasses to increase the reactivity). The plasma region is where plasma is generated in an enclosure or open air.

In a present embodiment, the invention describes an environmentally friendly and organic production-compatible solution to the problem using a low-temperature plasma system for the treatment of dormant plant meristems including flower buds and vegetative buds and cambium tissue, on whole plants or parts of plants (like cuttings, bulbs, and tubers) both in-situ and ex-situ.

In some embodiment of the present invention, the objective may be achieved by the use of low-temperature plasma to treat dormant or slow-growing (quiescent) buds, bulbs and other plant structures to release their dormancy, induce or advance bud break, increase and homogenize (regroup) budburst, flowering, and subsequent fruit ripening, to stimulate shoot growth and invigorate blossoms. The means have the extra advantage of advancing fruit maturity and shortening the period of fruit ripening which allows growers to get the produce earlier to the market thus capturing higher prices. Additionally, the method may reduce pests or bacterial and fungal infections (reduce the inoculum) and reduce the overall use of fungicides or pesticides.

The low-temperature plasma treatment may release endo, eco and para dormancy, which may advance sprouting, increase the vigor of vegetative shoots and blossoms and lowers pest growth or bacterial and fungal growth. Under such conditions, sprouting and flowering may be hastened, percentage budbreak may be increased and shoot growth rate improved. Fruit maturity may be advanced and fruit size enhanced. Finally, the treatment may increase the overall growth, flowering, fruit set and yield of treated plants and plant parts.

In other embodiments, the treatment may be applicable either indoor, in protected environments or enclosures or the field. The plasma generating system may be stationary, but the plants or the plasma system or both may also be moved to treat the plants in a continuous manner either indoor or outdoor. The plasma treatment device may consist of a non-thermal plasma system generating a temperature in the range of 0 to 200° C. at a pressure of 10 to 2000 Pa for 5 seconds to 50 hours for each step, in an inert, N-containing, C-containing, O-containing, H-containing or inert-O/N/C/H-containing gas atmosphere. The plasma may be generated in the open air or metal, glass or ceramic enclosure, with or without an external gas supply. The plasma treatment may involve one to ten treatment steps of variable durations. The plasma system may be powered by either a DC, pulsed DC, kHz, RF, pulsed RF or Microwave, power supply and the plasma is generated in metal, glass or ceramic container using a waveguide, one or two electrodes. One or both electrodes are covered by a dielectric medium, and they are air or liquid cooled.

In one embodiment of the present invention, the low-temperature plasma treatment may release dormancy, advances sprouting, increase the vigor of vegetative shoots and blossoms. Therefore, the sprouting and flowering may be hastened, percentage bud break may be increased and shoot growth rate may be improved. Fruit maturity is advanced, and fruit size is enhanced. Finally, it may increase the overall growth, flowering, fruit set and yield of treated plants and plant parts. As an extra advantage, plasma lowers insect, bacteria and fungus growth which may reduce the need for pesticides.

In other embodiments of the present invention, the plasma region may be cooled by force-feeding air or other gasses. The plasma region may be force fed with water vapors and other gasses to increase the reactivity. The plant or buds may be within the plasma or afterglow region or are exposed to the plasma generated radicals. The plant/buds may be connected to the grounded terminal of the power. The generated plasma may have a peak current density of approximately 0.0001 to 1000 mA/cm2 on the electrode/s. The plasma device may contain one or more sets of electrodes operated in a cluster or independent manner. One or both electrodes are curved to provide a uniform treatment to the plant parts. Preferably, the plasma treatment device may generate non-equilibrium plasma in a metal enclosure using a pulsed DC or kHz or RF or pulsed RF power supply with a gas temperature in the range of 0 to 80° C. and at a pressure between 0.2 and 760 Torr for 0.1 to 30 minutes for each step, in an inert and O-containing and H-containing gas atmosphere. The plasma treatment may involve several treatment steps of variable durations with a gap time of several hours to days between two consecutive treatments.

FIG. 1 is an illustration of an exemplary low-temperature plasma system 100, in accordance with an embodiment of the present invention. In the present embodiment shown, the two or more metallic electrodes 110 may be arranged as parallel, coaxial or curved plates at a predetermined distance to a plant material 125 to be treated. Each electrode 110 may be covered with a dielectric material 115 including, but not limited, to ceramic, glass, or a coating material. One of the electrodes may be connected to a positive side 130 of a power supply 140 and the other electrode may be connected to negative side or grounded terminal 135 of the power supply. The plant material 125 and electrodes 110 may be housed in an enclosure 120. The plant material 125 may be complete plant or plant parts including individual samplings, cuttings, vines shrubs, tubers, bulbs etc. The plant material may be engaged with the grounded terminal 135 of the power supply 140. The enclosure 120 may comprise of, but not limited to, an air tight chamber, a vacuum sealed chamber or a growth chamber. A plasma region 123 may be disposed between the electrodes 110 and the plant material 125 within the enclosure 120. A container 150 may confine gas 157 where the gas is configured to be released through a release line 160 in a controlled manner with a gas flow controller 155 and a timer 143. The gas 157 may comprise of an inert gas including N-containing, C-containing, O-containing, H-containing or inert-O/N/C/H-containing gas atmosphere. Gas temperature may be provided by a temperature indicating means 153. A generated plasma within the plasma region 123 may have a peak current density of approximately 0.1 to 100 mA/cm2 on the electrode/s 110, which peak current density depends on the plant species and plant organ. Upon applying the current to the electrodes 110 with the presence of gas 157, the gas discharge formed by the dielectric material 115 covering the electrodes 110 results into a cold plasma. The cross sectional area of the gas discharge is defined by the plasma region 123 within which sufficient electric field strength for maintaining the gas discharge is present between the dielectric material 115 and the plant. The current, treatment time duration and interval may be varied with a power supply controller 145. Release or treatment time duration and interval may be managed manually or automated by the timer 143. In some embodiment, a treatment controller (145+143) is a combination of the power supply controller 145 and timer 143. The plasma region 123 is cooled through cooling device 175 by, but not limited to, force-feed air, water vapors, or other gasses 180 to increase the reactivity.

In additional embodiments, the timer 143 may control the release of gas 157 and the generation of current. In other embodiments, the plasma treatment device 100 may generate a non-equilibrium plasma using one or several electrodes 110 operated together or independently where all electrodes may be covered by a dielectric material 115 in open air using a pulsed DC or kHz or RF or pulsed RF power supply 140 with a gas temperature in the range of 0 to 80° C. for 0.1 to 30 minutes duration for each step. In each step, a plasma treatment is performed and there is a gap time interval between multiple plasma treatment steps., with additional fluid 170 held in a container 165 fed to lower the gas temperature or increase the reactivity. In other embodiments, the two or more electrodes 110 comprises flexible electrodes which may be arranged as concentric or curved cylinders to provide a uniform treatment to all plants/organ parts 125. The plasma treatment may involve several treatment steps of variable durations with a gap time managed manually or by the automated timer 143, of several hours to days between two consecutive treatment durations to increase the advantages. The plasma system 100 may be stationary, or mobile carried by humans or mounted on a vehicle to provide pulsed or continuous treatment to target plant parts. The plasma source may be mounted on a moving vehicle such as a tractor In other embodiments of the present invention the plasma source may be stationary and the plant material to be treated may be brought to the treatment area either by hand, an automatic feeding apparatus or a conveyor belt.

Figure 2A:
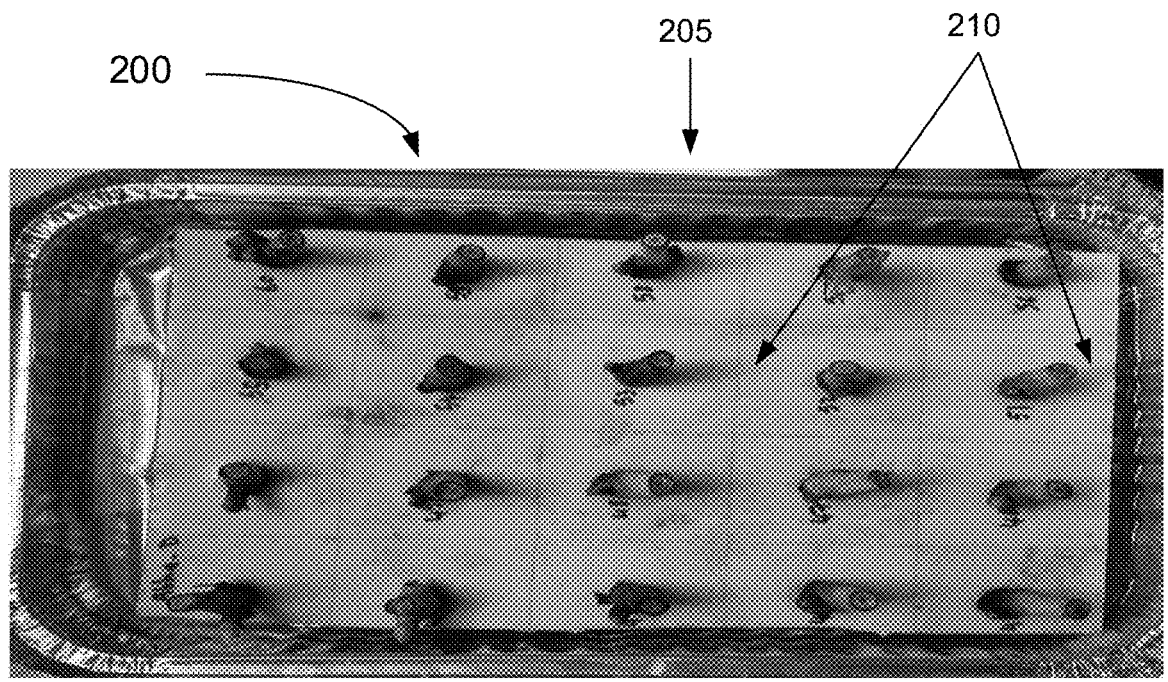
FIG. 2A and FIG. 2B is an illustration of an exemplary comparison of plasma-treated and untreated grape buds of a variety Muscat of Alexandria, in accordance with an embodiment of the present invention.
Figure 2B:
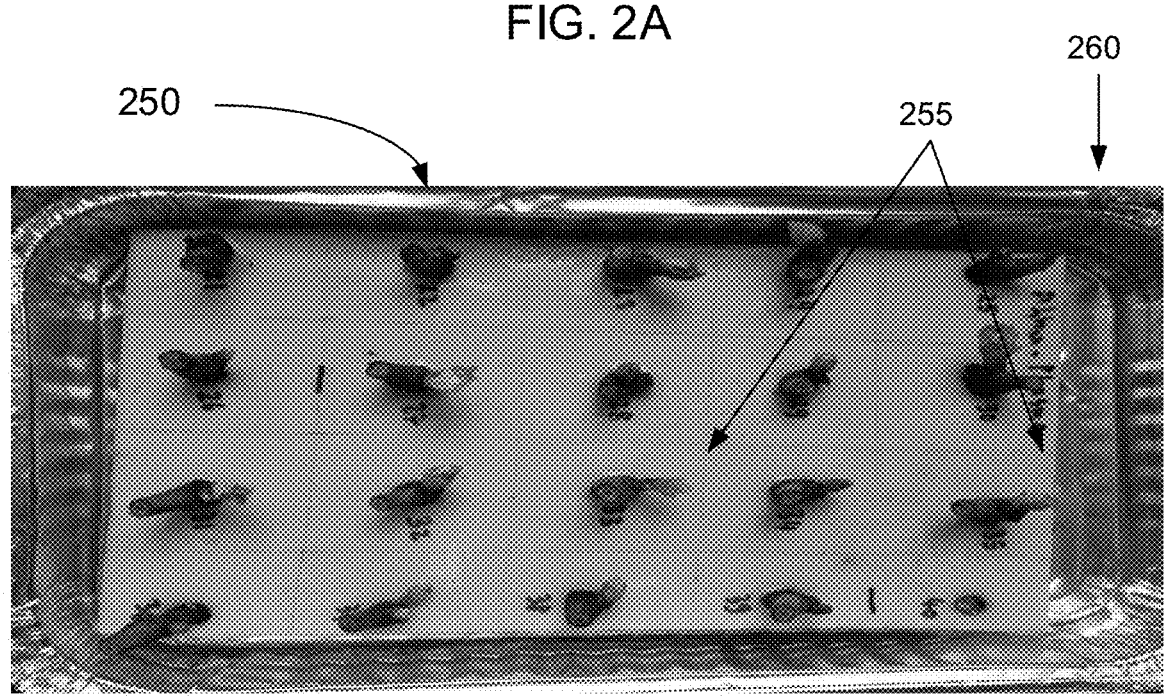

FIG. 2A and FIG. 2B is an illustration of an exemplary comparison of untreated grape buds 200 and plasma-treated grape buds 250 of a variety Muscat of Alexandria, in accordance with an embodiment of the present invention. FIG. 2A is an exemplary illustration of untreated grape buds 205 of the variety Muscat of Alexandria. In the present embodiment shown, three sets of 20 similar one-node cuttings 210 were left untreated to serve as a control. FIG. 2B is an exemplary illustration of plasma treated grape buds 260 of the variety Muscat of Alexandria. In the present embodiment shown, three sets of 20 one-node cuttings of the dormant grape shoot 255 of the variety Muscat of Alexandria were treated for 5 minute durations with low temperature or cold plasma. After treatment, the cuttings were forced in a growth chamber set to 25 C temperature, 14H light and 10H dark photoperiod and 80% relative humidity. Alternatively, the cuttings may be kept in a room or a green house.

Figure 3:
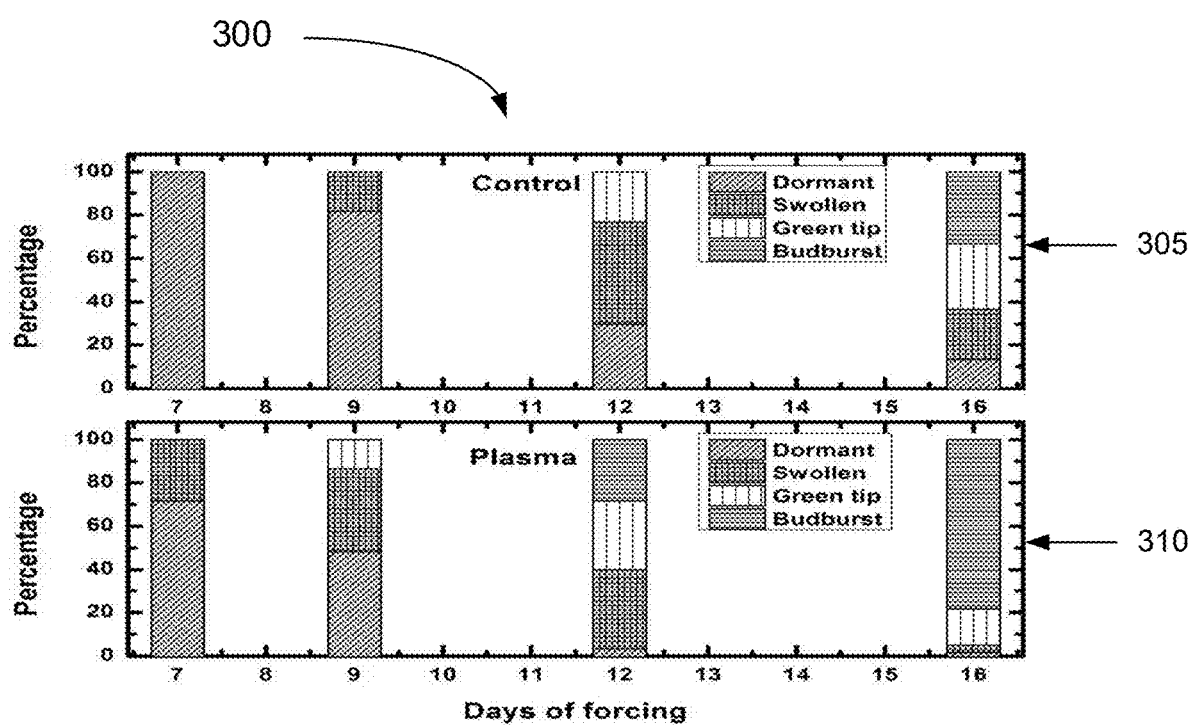
FIG. 3 is a diagram showing a quantitative effect of plasma treatment on growth of grape buds of the variety Muscat of Alexandria, in accordance with an embodiment of the present invention.

FIG. 3 is a diagram showing a quantitative effect 300 of plasma treatment on growth of grape buds of the variety Muscat of Alexandria, in accordance with an embodiment of the present invention. In the present embodiment shown, diagram 310 illustrates bud break was advanced by the plasma treatment. After 16 days of forcing, treated cuttings 255 had close to approximately 80% bud break while control cuttings 210 had only approximately 34% bud break.

Figure 4:
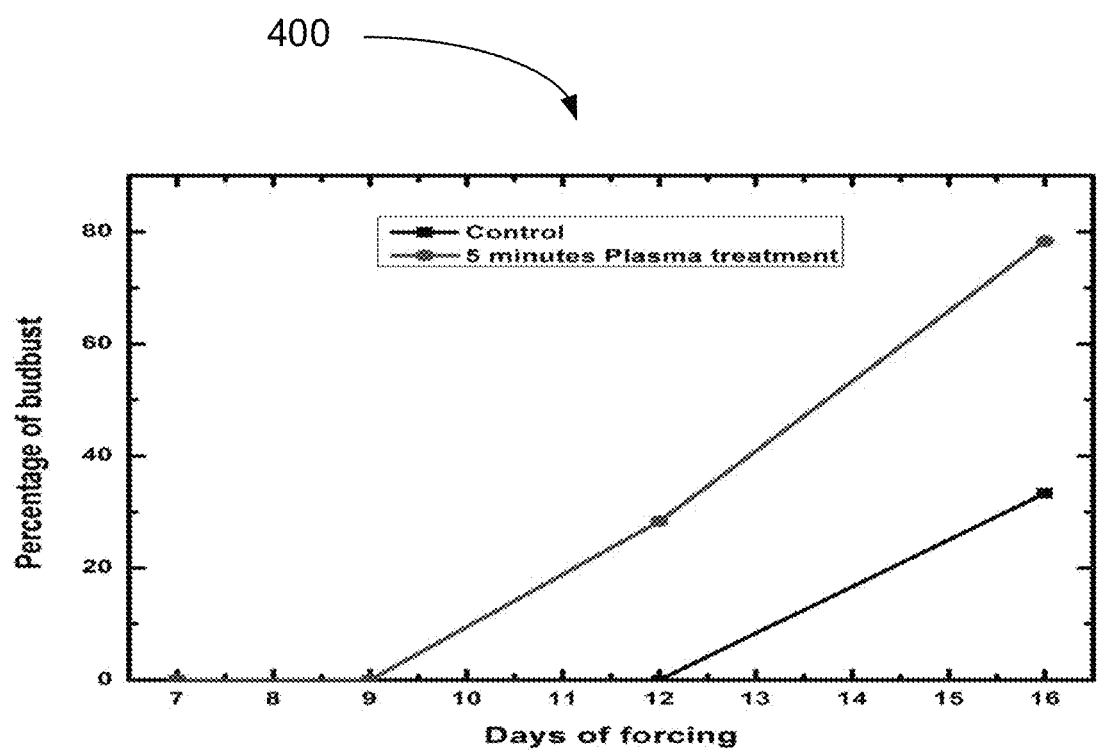
FIG. 4 is a diagram showing a quantitative effect of plasma treatment on growth of grape buds of the variety Muscat of Alexandria, in accordance with an embodiment of the present invention.

FIG. 4 is a diagram showing a quantitative effect 400 of plasma treatment on growth of grape buds of the variety Muscat of Alexandria, in accordance with an embodiment of the present invention. In the present embodiment shown, budburst of plasma treated grape plants 260 starts after 9 days of 5 minute duration plasma treatments. While budburst of non-treated grape plants 205 started showing after 12 days.

Figure 5A:
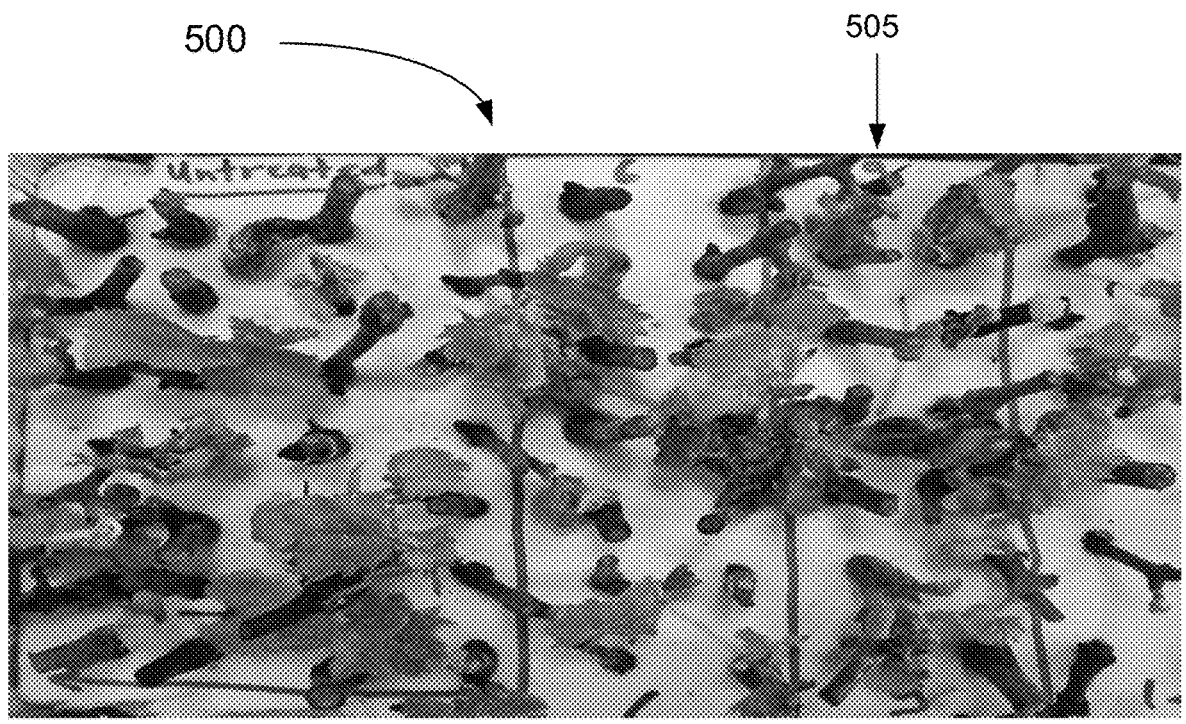
FIG. 5A and FIG. 5B is an illustration of an exemplary comparison of plasma-treated and untreated grape buds of a variety Muscat of Alexandria, in accordance with an embodiment of the present invention.
Figure 5B:
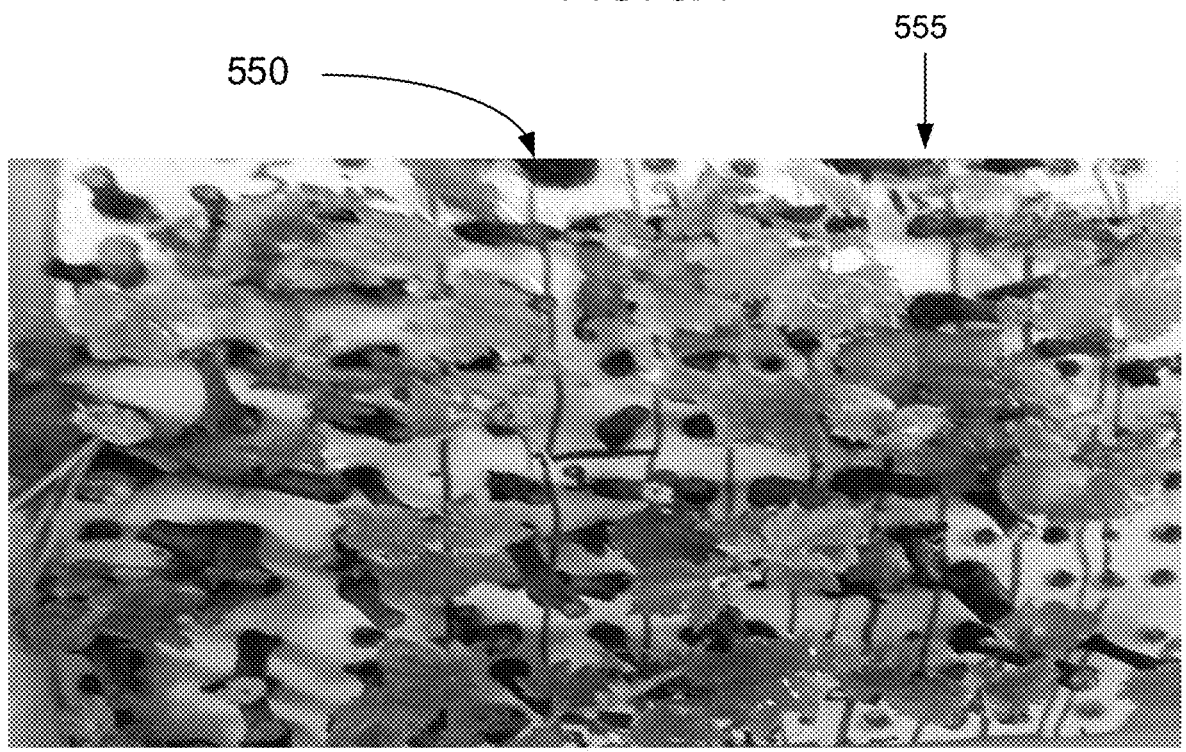

FIG. 5A and FIG. 5B is an illustration of an exemplary comparison of untreated grape buds 500 and plasma-treated grape buds 550 of a variety Muscat of Alexandria, in accordance with an embodiment of the present invention. FIG. 5A is an exemplary illustration of untreated grape buds 505 of a variety Muscat of Alexandria, in accordance with an embodiment of the present invention. In the present embodiment shown, percentage budbreak was lowest, and the sprouts were shortest for the untreated cuttings. At the end of forcing, about half of sprouts of untreated cuttings had wilted due to fungal infections. FIG. 5B is an exemplary illustration of plasma-treated grape buds 555 of a variety Muscat of Alexandria, in accordance with an embodiment of the present invention. In the present embodiment shown, three sets of 25 one-node cuttings of dormant grape shoots of the variety Al-Raezki were treated for the duration of 2 minute, 5 minute and 10 minute with low temperature or cold plasma. The time of vegetative growth may have been altered which may in turn may the flowering and fruiting of the plant. As shown, all low temperature or cold plasma treatments advanced budbreak but more so at the 5 min treatment duration. Budbreak was highest (FIG. 6) and the shoots or sprouts were longest and had bigger leaves in the cuttings (FIG. 7) treated at the 5 minute duration. The incidence of wilting was 12%, 14% and 19% in the cuttings treated for the 2 minute, 5 minute and 10 minute durations, respectively, (FIG. 8). Plasma may have suppressed the numbers of bacterial and fungal populations and reduced their capacity to proliferate.

Figure 6:
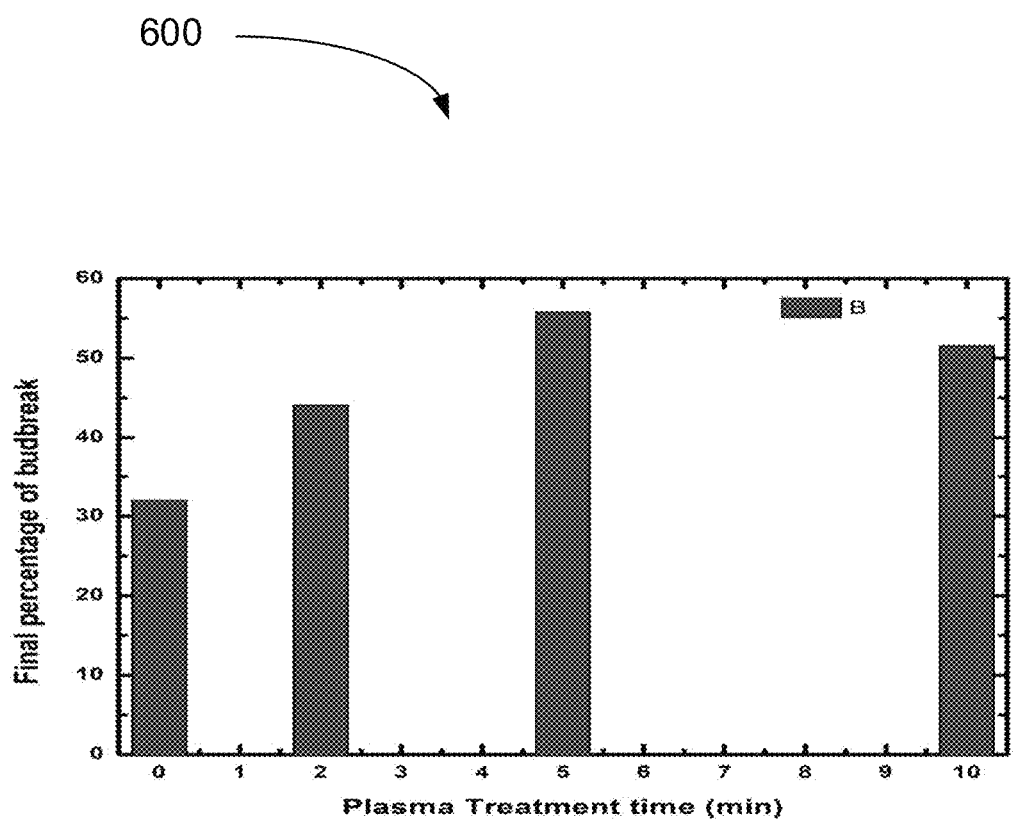
FIG. 6 is a diagram showing a final percentage of bud break as a function of plasma treatment time in fully dormant grape buds of the variety Al-Raezki after one month of forcing, in accordance with an embodiment of the present invention.

FIG. 6 is a diagram showing a final percentage of bud break as a function of plasma treatment time in fully dormant grape buds of the variety Al-Raezki after one month of forcing, in accordance with an embodiment of the present invention. In the present embodiment shown, percentage of bud break was highest in the buds plasma treated for the duration of 5 min.

Figure 7:
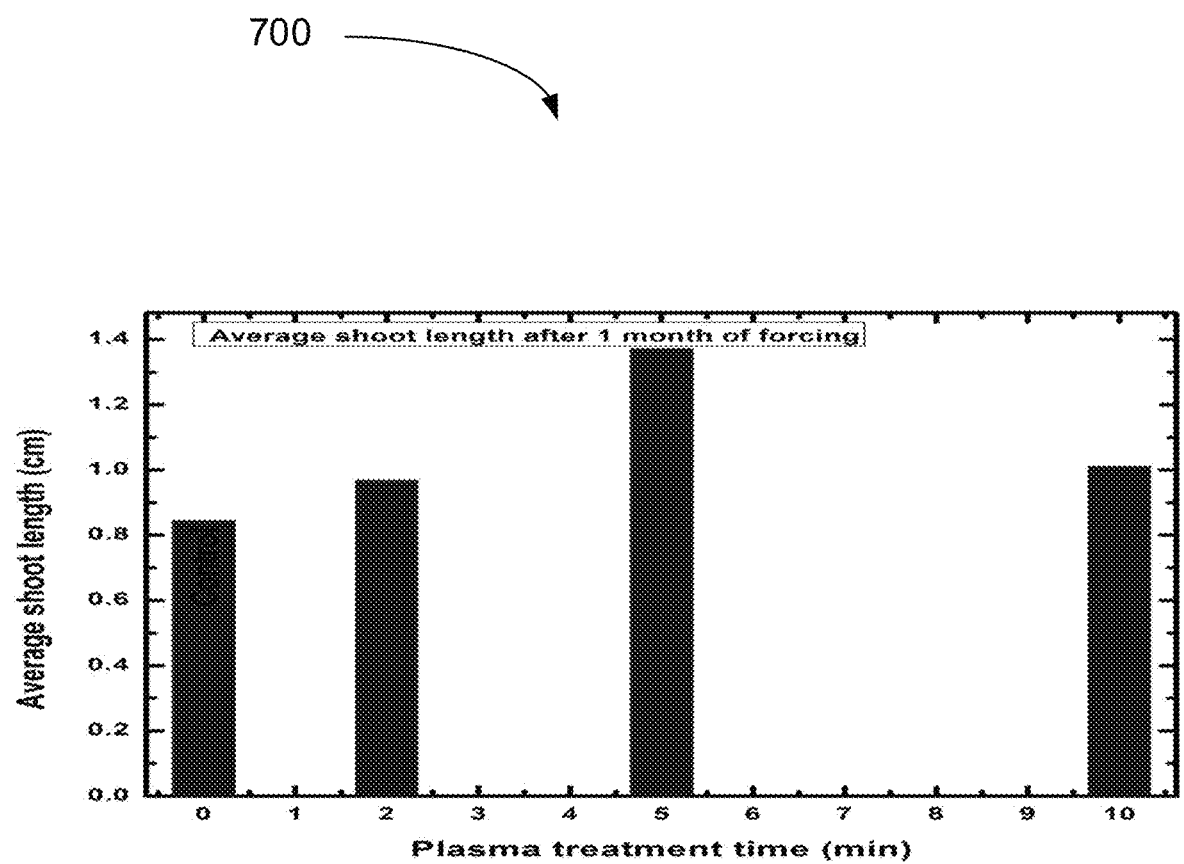
FIG. 7 is a diagram showing an average shoot length after one month of forcing of one-node cuttings of the grape variety Al-Raezki as a function of plasma treatment time of the dormant buds, in accordance with an embodiment of the present invention.
Figure 8:
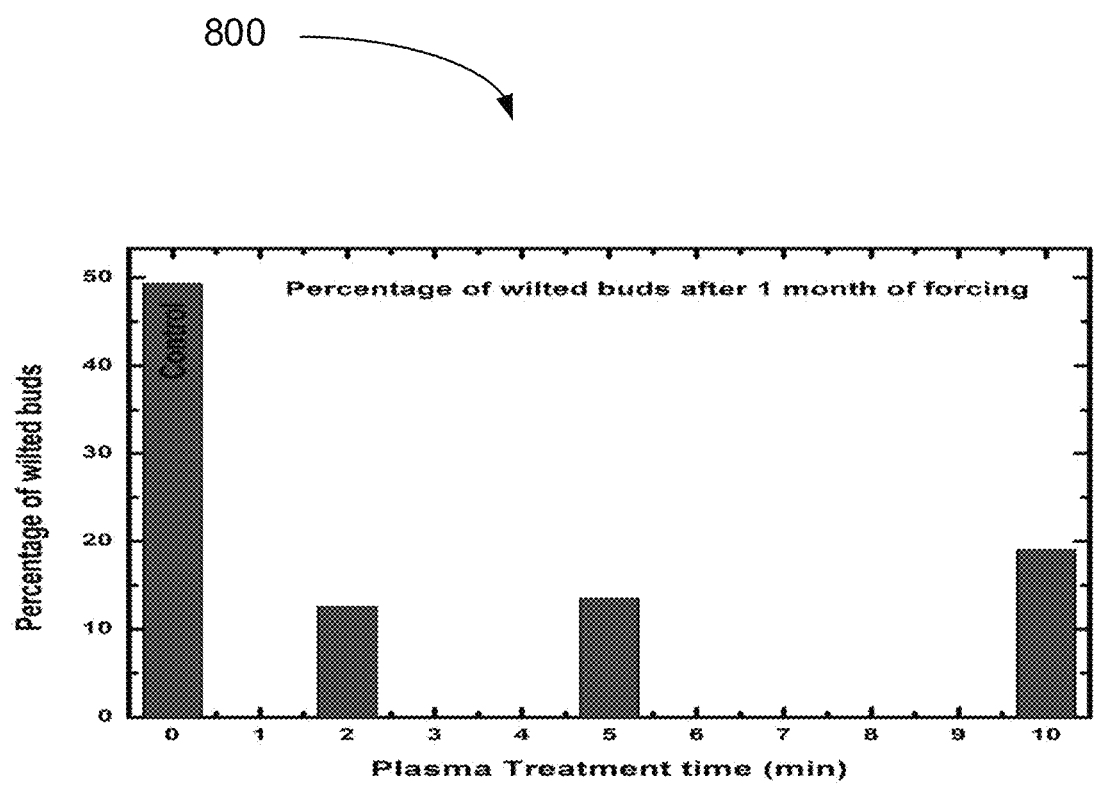
FIG. 8 is a diagram showing a percentage of wilted open buds due to fungi infections of plasma-treated and untreated grape buds of the variety Al-Raezki, in accordance with an embodiment of the present invention.

FIG. 7 is a diagram showing an average shoot length after one month of forcing of one-node cuttings of the grape variety Al-Raezki as a function of plasma treatment time of the dormant buds, in accordance with an embodiment of the present invention. In the present embodiment shown, the shoots or sprouts were longest and had bigger leaves in the cuttings treated for the 5 minute duration.

FIG. 8 is a diagram showing a percentage of wilted open buds due to fungi infections of plasma-treated and untreated grape buds of the variety Al-Raezki, in accordance with an embodiment of the present invention. In the present embodiment shown, untreated grape cuttings show a higher percentage of wilted open buds due to fungi infections. The percentage of wilted buds was 12%, 14% and 19% in the cuttings treated for the plasma duration of 2 minute, 5 minute and 10 minute.

Figure 9:
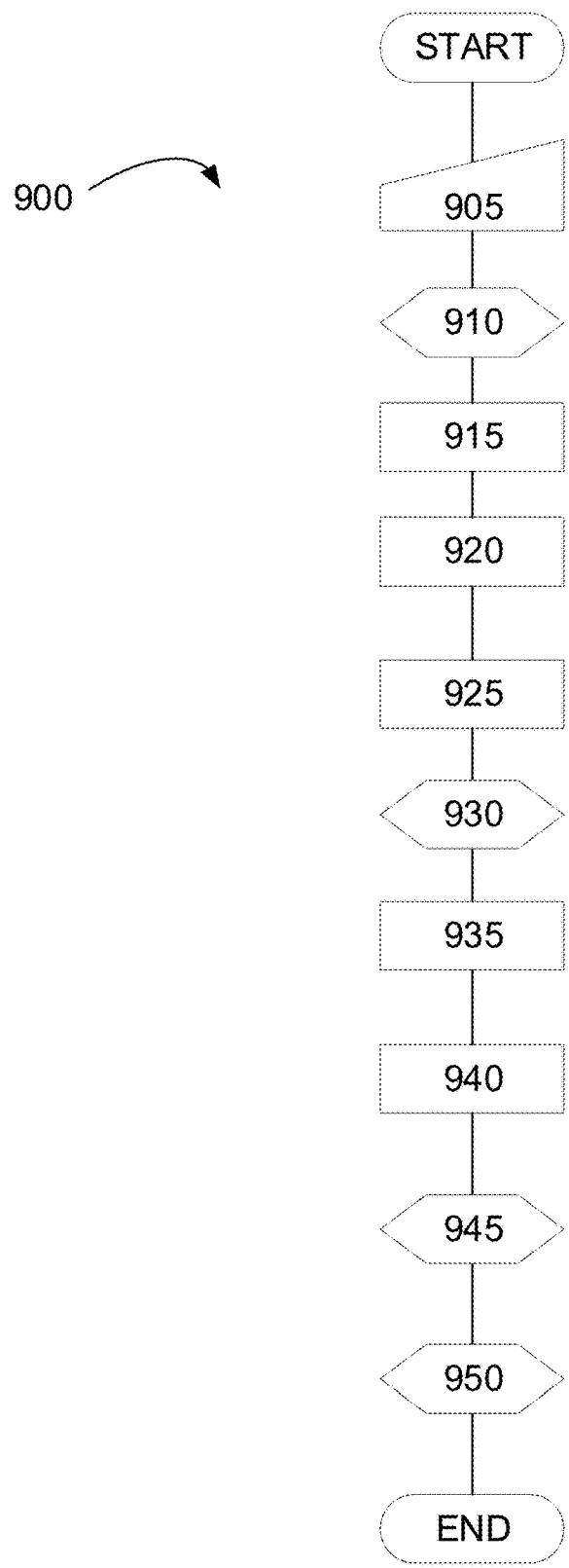
FIG. 9 is a diagram showing a method of releasing bud dormancy of a plant with plasma treatment, in accordance with an embodiment of the present invention.

FIG. 9 is a diagram showing a method of releasing bud dormancy of a plant with plasma treatment, in accordance with an embodiment of the present invention, may include, in a step 905, covering a first electrode and a second electrode with a dielectric. The electrodes may comprise of, but not limited to, segmented, flexible, metallic, and/or stiff electrodes.

In step 910, surround the plant with the first and second electrodes operable for uniform treatment of the plant. The plant may include but not limited to, buds, bulbs, seeds, corms, tubers, rhizomes or cuttings. The electrodes may be arranged as, but not limited to, parallel, coaxial, or curved electrodes. In an embodiment, the plant may be surrounded with two electrodes in parallel, coaxial, or curved. In step 915, create a plasma region between the plant and the first and second electrodes. The plasma region is where plasma may be generated in an enclosure or open air. In step 920, couple the first electrode to a positive side of a power supply. The power supply may include, but not limited to, a DC or pulsed DC power supply. In step 925, couple the second electrode to a negative side or grounded terminal of the power supply.

In step 930, engage the plant to the grounded terminal of the power supply. In alternative embodiments, the plant may be connected to a separate DC, pulsed DC, kHz, RF or pulsed RF bias power supply. In step 935, enclose the plant and the first and second electrodes in an enclosure. In step 940, treat the plant with a proximate low-temperature plasma. A peak current of approximately 0.0001 to 100 mA/cm2 may be applied to the electrodes to generate the low-temperature plasma. The plant may be treated with low-temperature plasma in multiple steps, each with a treatment time of 1 second to 50 hours.

In step 945, control the time duration and interval of the treatment. In step 950, operate a gas flow controller at a predetermined gas pressure of air or flowing gasses. A gas pressure of 10 to 2000 Pa in air or flowing gasses may be applied.

The following are non-limiting examples of use for some embodiments of the present invention. In one example, plant bulbs, tubers, corms, roots or rhizomes may be sealed in a package with a flexible top while the propagation organs may be sealed in a package containing a controlled gas mixture suitable for plasma treatment requirements. The plasma may be generated inside the package holding the propagation organs with external electrodes. In this example, the plasma treatment may typically cause the release of potential dormancy of the organ meristems and sterilization of the organs allowing a longer shelf life. The plasma may also influence growth and flowering of these organs after sowing. In another exemplary use, the dormant bulbs, tubers, corms, roots or rhizomes of plants such as, but not limited to, tulip, potato, gladiolus, dahlia, or iris, respectively, may be treated in a low-pressure plasma system. The organs may be placed in a rotating drum. The rotating drum typically allows for uniform plasma treatment. In yet another example of use, any number of pots containing live plants may be placed by hand or with an automated delivery system such as a conveyor belt in a sealed plasma system with multiple trays each exposed to an electrode. The plants may be treated with plasma under controlled conditions to induce and organize flowering. The treatment may also improve stress tolerance and reduce bacteria, fungi and pest populations on the plant.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing the low-temperature plasma system for the treatment of dormant plant meristems including flower buds and vegetative buds and cambium tissue, on whole plants or parts of plants (like cuttings, bulbs, and tubers) both in-situ and ex-situ according to the present invention will be apparent to those skilled in the art. Various aspects of the invention have been described above by way of illustration, and the specific embodiments disclosed are not intended to limit the invention to the particular forms disclosed. The particular implementation of the low-temperature plasma system for the treatment of dormant plant meristems may vary depending upon the particular context or application. By way of example, and not limitation, the low-temperature plasma system for the treatment of dormant plant meristems described in the foregoing were principally directed to flower buds and vegetative buds and cambium tissue, on whole plants or parts of plants (like cuttings, bulbs, and tubers) both in-situ and ex-situ implementations; however, similar techniques may instead be applied, but not limited to, trees, shrubs, bushes, shrubbery, or briers, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A method of releasing bud dormancy or promoting a vegetative growth of a plant, the method comprising the steps of:

covering a first electrode and a second electrode with a dielectric material;

surrounding the plant with said first and second electrodes, in which said plant comprises one or more plants;

creating a plasma region between the plant and said first and second electrodes, wherein said plasma region is where plasma is generated;

coupling said first electrode to a positive side of a power supply;

coupling said second electrode to a negative side or grounded terminal of said power supply;

engaging the plant to said grounded terminal of said power supply;

enclosing the plant and said first and second electrodes in an enclosure;

treating the plant with a proximate low-temperature plasma generated by a low-temperature plasma generating means, wherein said treatment is configured to be operable for releasing the bud dormancy of the plant, and in which said treatment comprises releasing or discharging, with a gas flow controller, inert gas at a controlled rate to said plasma region via a release line;

controlling, with a timer device and said gas flow controller, a duration and/or interval of said release or discharge of the inert gas to said plant receiving said treatment, wherein said controlled duration and/or interval is configured to promote the vegetative growth of the plant including said release of bud dormancy of the plant;

applying current, with said power supply, to said first and second electrodes with the presences of inert gas to produce said proximate low-temperature plasma, in which said power supply comprises at least one of, a DC and pulsed DC power supply connected to said first and second electrodes; and varying, with a power supply controller in combination with said timer device, a time duration and/or interval of said application of current to said first and second electrodes.

2. The method of claim 1, further comprising the step of connecting the at least one or more plants to at least one of a separate DC, pulsed DC, kHz, RF, and pulsed RF bias power supply.

3. The method of claim 1, further comprising the step of applying a peak current of approximately 0.0001 to 100 mA/cm2 to said first and second electrodes.

4. The method of claim 3, further comprising the step of generating said low-temperature plasma inside said enclosure.

5. The method of claim 3, in which said first and second electrodes comprises flexible electrodes and curved electrodes to provide uniform treatment of said plant, in which said plant comprises one or more plants.

6. The method of claim 3, further comprising treating the plant with low-temperature plasma in multiple steps, each with a treatment time of approximately 1 second to 50 hours.

7. The method of claim 3, further comprising operating the gas flow controller at a gas pressure of about 10 to 2000 Pa in air or flowing gasses.

* * * * *